United States Patent
Lohr

[19]

[11] Patent Number: 5,933,133
[45] Date of Patent: Aug. 3, 1999

[54] LOW-IMPACT KEYBOARD

[76] Inventor: Daniel James Lohr, 3116 Longbow Ct., Dallas, Tex. 75229

[21] Appl. No.: 08/801,763

[22] Filed: Feb. 18, 1997

[51] Int. Cl.⁶ ..................................................... G09G 5/00
[52] U.S. Cl. .......................... 345/168; 200/5 R; 341/22; 400/490; 400/491; 400/495
[58] Field of Search ............................. 345/168; 341/22; 200/5 R, 5 B; 400/480, 481, 490, 491, 491.2, 493.1, 495

[56] References Cited

U.S. PATENT DOCUMENTS

| | | | |
|---|---|---|---|
| 793,462 | 6/1905 | Munson | 400/493.1 |
| 3,964,594 | 6/1976 | Gabbrielli et al. | 400/491 |
| 4,039,068 | 8/1977 | Giorza et al. | 400/491 |
| 5,172,990 | 12/1992 | Weng | 400/495 |
| 5,290,115 | 3/1994 | Little | 400/491 |
| 5,494,363 | 2/1996 | Hochgesang | 400/490 |
| 5,508,479 | 4/1996 | Schooley | 200/5 R |
| 5,525,979 | 6/1996 | Engle et al. | 341/22 |
| 5,595,449 | 1/1997 | Vitkin | 341/22 |
| 5,612,692 | 3/1997 | Dugas et al. | 345/168 |

Primary Examiner—Jeffery A. Hofsass
Assistant Examiner—John Tweel, Jr.
Attorney, Agent, or Firm—Smith & Danamraj, P.C.

[57] ABSTRACT

A low-impact keyboard for decreasing the risk of a repetitive stress injury to the user, having a plurality of keys and an impact absorbing mechanism. In a preferred embodiment, the keyboard includes a flexible circuit board beneath the keys and a circuit board support plate beneath the flexible circuit board. The impact absorbing mechanism is an impact sheet of a resilient material between the flexible circuit board and the circuit board support plate, below the contact point of each key.

4 Claims, 6 Drawing Sheets

LOW-IMPACT KEYBOARD

BACKGROUND OF THE INVENTION

1. Technical Field of the Invention

This invention relates to computer input devices, and more particularly, to a low-impact keyboard for decreasing the risk of a repetitive stress injury such as carpal tunnel syndrome.

2. Description of Related Art

Along with the rapid growth of machine automation and the widespread personal and professional use of computers, there has been an increase in repetitive stress injuries. Commonly occurring in the workplace, these injuries include upper limb disorders such as "Carpal Tunnel Syndrome", cumulative trauma disorder, and occupational overuse syndrome.

Frequent users of personal computers, such as shown in FIG. 1, are at risk for a repetitive stress injury when interacting with the device through a standard electronic keyboard. Stress injuries arise from accumulative strain on the limbs over a period of time. In contrast to using a traditional manual typewriter, the computer keyboard user no longer takes breaks from data input for carriage returns, error corrections, and paper insertions. Instead, the user achieves the equivalent of these functions with additional keystrokes, never removing the hands from the keyboard or repositioning the arms to reach for items such as correction fluid, paper, or an adding machine.

This uninterrupted use places a continuous strain on the fingers and upper limbs, especially due to the stress of the constant impact from the keyboard. When each key reaches the bottom of a keystroke, it "bottoms out," causing a small impact to the fingers as the key hits onto a hard plastic surface or non-resilient material. The vibration of impact travels up the hand and arm, stressing the soft tissues such as the muscles, tendons, and ligaments. This is similar to the vibration of impact traveling up the leg of a runner when his foot hits the ground, causing his muscles and joints to become sore. Typing on a keyboard without any cushion for the impact of the keys is similar to a person running without cushioning in his shoes, quickly leading to soreness and pain if done continuously, and contributing to the development of a repetitive stress injury.

For example, with reference to FIG. 1, a personal computer system 10 typically includes a computer 12, a display device 14, a keyboard 15 and a mouse 16. The standard keyboard 16 includes an alphanumeric keypad 18, a row of function keys 20, a numeric keypad 22 and a command keypad 24. While seated at the computer system 10, facing the display 14, the user's upper torso, arms, wrists, and hands rarely change position while the user's fingers are operating the keyboard 15. This uninterrupted, repetitive impact of the fingers over a standard keyboard may cause excessive use and chronic fatigue of the muscles and tendons, causing the tendons to swell, and at the same time, squeezing the median nerve as it passes through the wrist ligament. This leads to pain and discomfort, and it is commonly associated with symptoms such as numbness, burning, and tingling sensations in the hands and arms. These symptoms are commonly associated with Carpal Tunnel Syndrome, a syndrome of median nerve compression with symptoms in the hands and arm where the nerve runs. Medical treatments for this condition include physical therapy and surgery to relieve the pressure on the median nerve.

FIGS. 2–4 illustrate the tissue and nerves affected by carpal tunnel syndrome, depicting the human wrist 30 in FIGS. 2 and 3, and the arm 40 in FIG. 4. With reference to FIGS. 2–4, carpal tunnel syndrome is caused by compression of the median nerve 31, which travels from the neck to the fingers, through the upper arm 22, forearm 24, wrist 25, and hand 28. The palmar carpal ligament 32, shown reflected in FIG. 2, wraps around the bones 27, 29, of the wrist 25, otherwise known as the carpals, to form the carpal tunnel 35. The muscles 23 of the forearm 24 are attached by the tendons 26 to the fingers and travel underneath the carpal ligament 32, as does the median nerve 31.

Carpal tunnel syndrome occurs when the tissues in the carpal tunnel 35 become irritated and as a result, swell and eventually compress the median nerve 31, causing the symptoms noted above. Traditional writings on carpal tunnel syndrome have identified the cause of the irritation and swelling variously as chronic fatigue of the muscles, overuse of the tendons, and rubbing of the tendons, muscles and bones due to repetitive use of the hands and fingers. In particular, holding the wrists in "unnatural" positions enhance the rubbing of tendons and contribute to muscle fatigue. For example, the position of the wrist while typing on a conventional, straight keyboard has been cited as a major contributor to carpal tunnel syndrome.

As a result of the above diagnosis of the cause of carpal tunnel syndrome, the prior art approaches to preventing these injuries include adjusting the work environment to better fit the user's body. These ergonomic adjustments include the use of wrist pads, split keyboards, keyboard replacements, and keyboards and drawers with wrist supports unitarily formed within. Devices such as the split keyboard create a "natural" position of the user's wrists while typing. These devices, however, have not significantly reduced the incidence of carpal tunnel syndrome.

The Applicant's research suggests that the traditional view of the cause of carpal tunnel syndrome is limited, and as a result, the prior art solutions to the problem have been largely ineffective. Carpal tunnel syndrome does not occur merely from repetitively using the fingers and hands. For thousands of years, people have worked at repetitive upper limb tasks which have not led to the large numbers of persons experiencing the symptoms described above. Even with the advent of the manual typewriter, there were not reported cases of symptoms similar to carpal tunnel syndrome.

Instead, the cause of the tissue irritation is from the repetitive impact stress caused by typing on keyboards on which the keys strike a hard surface at the bottom of the keystroke. The use of the non-giving design of a traditional keyboard is similar to repetitively striking the fingers against a hard desk top, or like a person running on hard concrete without cushioned shoes. The harder the fingers are struck, the more evident the "bone jarring" impact becomes. Each impact causes tension in the tendons to spike to high levels, and sets up a vibration which must be absorbed by the surrounding tissues. Although the impact of fingers on a keyboard may not appear injurious, the repetitive impact and resultant vibrations from thousands of keystrokes that end on a hard solid surface causes the tissues in the carpal tunnel 35 to become irritated, and as a result, to swell and eventually compress the median nerve 31.

The prior art neither teaches nor suggests a means to lessen the strain placed on the upper limbs through repetitive absorption of vibrations from the impact of each keystroke. In order to decrease the risk of a repetitive stress injury, it would be advantageous to have a low-impact keyboard which reduces the vibrations and tissue irritations associated with the repetitive impact of the fingers. The present invention provides such a solution.

SUMMARY OF THE INVENTION

The present invention provides an improved keyboard for decreasing the risk of repetitive stress injuries. The low-impact keyboard of the invention incorporates a means for cushioning each keystroke to decrease the vibrational impact traditionally absorbed into the body when the key reaches the hard bottom of the keystroke.

According to a preferred embodiment, the low-impact keyboard includes a plurality of keys and an impact absorbing mechanism. In one embodiment, the keyboard has an impact sheet mounted between a flexible circuit board and a circuit board support plate. In another embodiment, impact sheets are mounted between the caps of each key and a key cap strike plate, adjacent to the top surface of the strike plate. In still another embodiment, each key cap has a lower rim with an impact ring attached. In yet another embodiment, each key comprises a circuit contacting stem and a key cap having an upper interior surface, wherein an impact sheet is mounted to the upper interior surface of the cap.

In the preferred embodiment of the invention, the impact absorbing mechanism is composed of a resilient or elastomeric material, such as a blend of polymers, plastics and rubbers.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
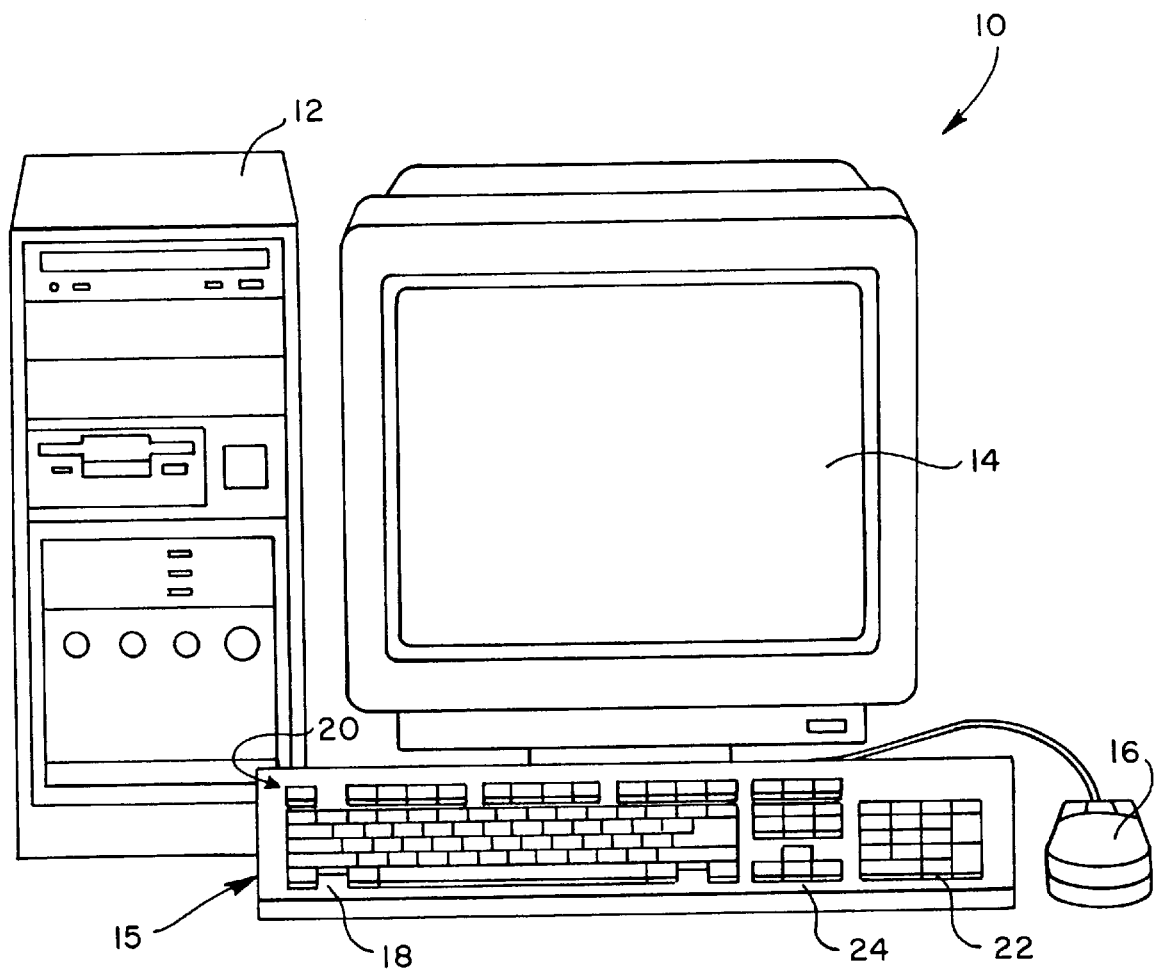
FIG. 1 is a diagram of a computer system including a computer display device and a keyboard incorporating an embodiment of the present invention.
Figure 2:
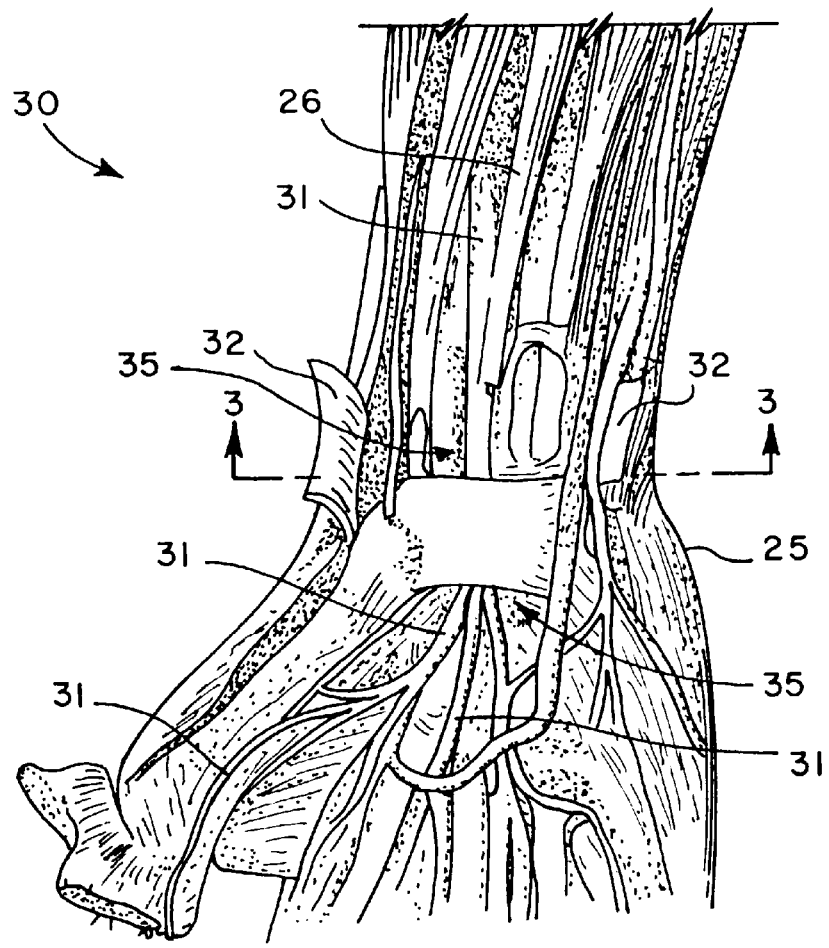
FIG. 2 is an illustrative drawing of the human wrist including bones, muscles, tendons, arteries, and nerves.
Figure 3:
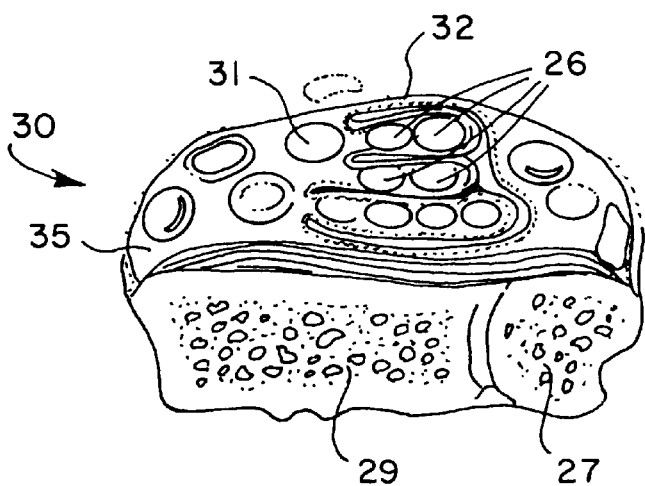
FIG. 3 is a cross-sectional view of the human wrist taken along line 3—3 of FIG. 2.
Figure 4:
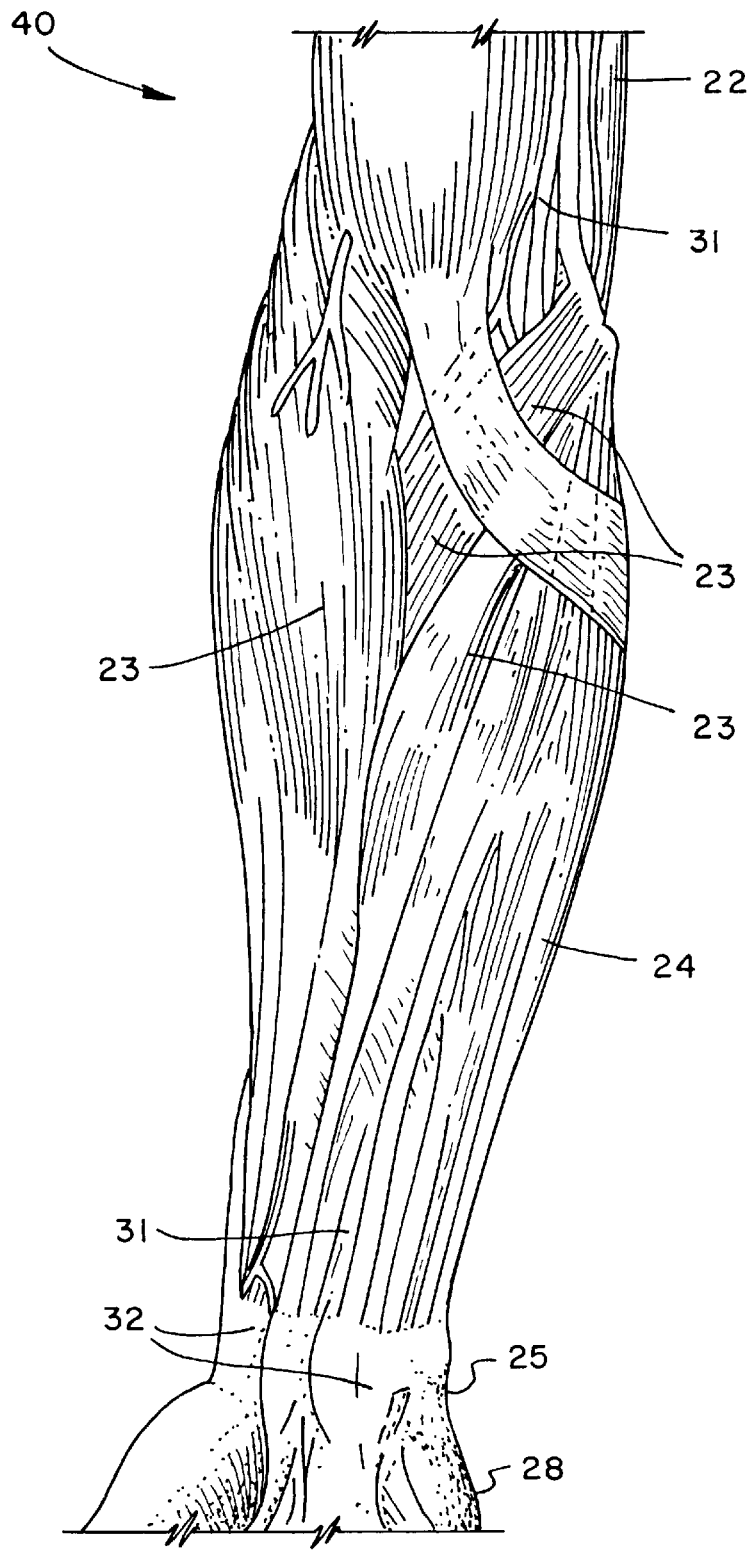
FIG. 4 is an illustrative drawing of the human arm depicting the path of the median nerve through the muscle tissue and palmar carpal ligament.
Figure 5A:
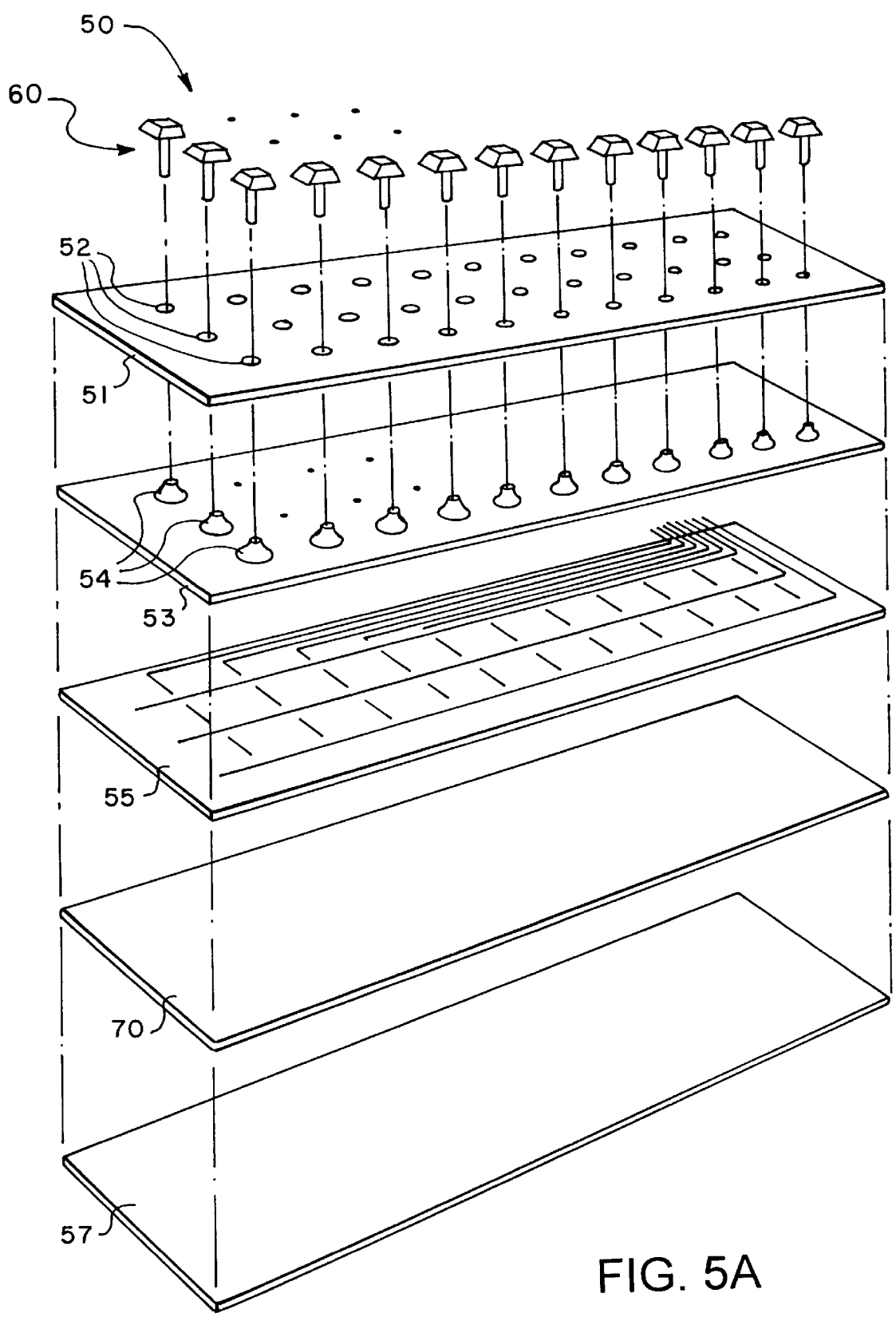
FIG. 5A is an exploded perspective view of a computer keyboard having a flexible circuit board, incorporating an embodiment of the present invention.
Figure 5B:
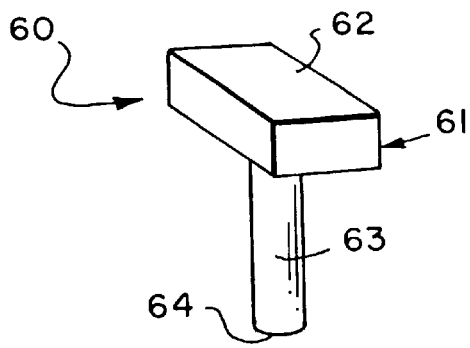
FIG. 5B is an example key style for use in keyboards incorporating an embodiment of the present invention.
Figure 5C:
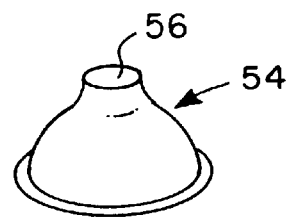
FIG. 5C is an example spring cup for use individually or on spring templates of keyboards incorporating an embodiment of the present invention.

Referring to FIGS. 5A, a preferred embodiment of the apparatus of the invention is shown and described. Low-impact keyboard 50 comprises a plurality of alphanumeric function and command keys 60, a strike plate 51 having a plurality of apertures therein, spring template 53 having a plurality of spring cups 54 mounted thereon in vertical alignment with the apertures 52, flexible circuit board 55, circuit board support plate 57, and an impact absorbing mechanism 70 mounted between the flexible circuit board 55 and the circuit board support plate 57. Referring to FIG. 5B, each key 60 has a cap 61, an upper typing surface 62, a stem 63, and a bottom 64. FIG. 5C illustrates a spring cup 54 which may be a flexible rubber or plastic cup having a conductive contact disk 56 mounted inside in the apex thereof. When the keyboard 50 is assembled, the stems 63 of each key 60 pass through the apertures 52 of strike plate 51 and rest above the top of each spring cup 54.

With continuing reference to FIGS. 5A–5C, the motion of the keys 60 during a keystroke will be described. During a downward keystroke, the user strikes the upper surface 62 of the key 60, depressing the cap 61 and causing the bottom 64 of stem 63 to contact the top of the spring cup 54 directly below the key. As the downward motion continues, the stem 63 deforms spring cup 54, causing the contact disk 56 to contact the flexible circuit board 55, creating an electrical contact with the circuit board 55, and sending a signal to the central processing unit (not shown) within computer 12. When contact is made, the motion and pressure of the stem 63 flexes the circuit board 55 into the impact absorbing mechanism 70 which may be a sheet of impact absorbing material as described below. The shock of the impact, and any vibrations created thereby, are absorbed into the impact absorbing sheet 70 and not returned to the user's fingers and upper limbs. The impact absorbing sheet 70 is made thick enough that the bottom edge of the key cap 61 does not strike the top of the strike plate 51 when the key 60 is fully depressed.

Flexible circuit board 55, and impact absorbing sheet 70 return to their original shape when the user releases the key 60, and spring cup 54 returns the key 60 to its raised position. The tension of spring cup 54, the distance of the downward keystroke, and the resiliency of the absorption mechanism 70, as more fully described below, control the touch response time of the upward key return.

Inclusion of the impact absorption mechanism 70 in keyboard 50, prevents the downward keystroke from creating a repetitive shock to the user's upper limbs. Without the absorption mechanism 70, the flexible circuit board 55 would be mounted directly on the rigid support plate 57, causing the repetitive cycle of injurious impacts and jarring of the bones and tissues of the user's upper limbs.

Figure 6:
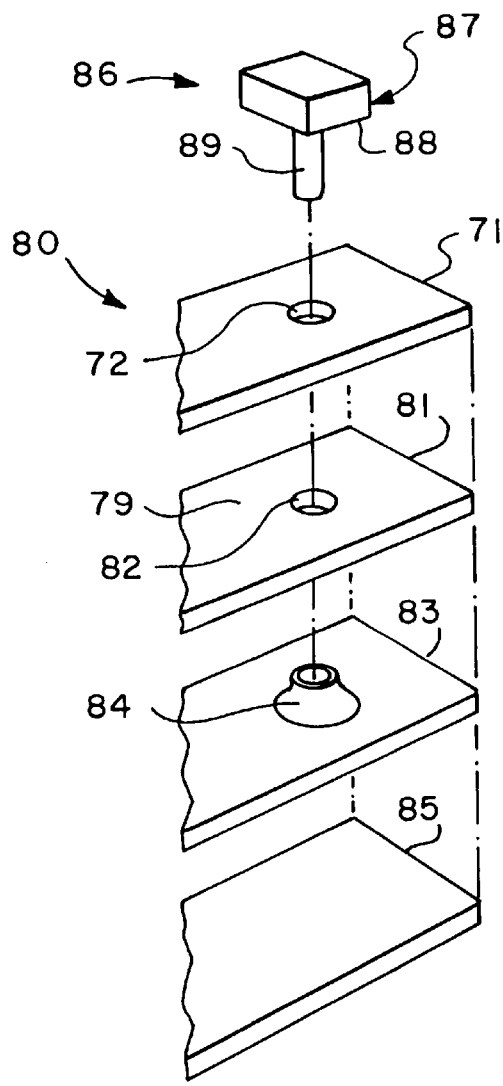
FIG. 6 is a partial exploded perspective view of a computer keyboard having a key cap strike plate, incorporating another embodiment of the present invention.

In another embodiment of the invention as shown in FIG. 6, the impact absorbing mechanism of keyboard 80 is an impact sheet 71 having a plurality of apertures 72. Impact sheet 71 is mounted on the upper surface 79 of key cap strike plate 81 above spring template 83 and circuit board 85. As shown, key 86 has a key cap 87, a rim 88 and a stem 89. Stem 89 passes through apertures 72 and 82 of mechanism 71 and plate 81 and rests above the top of spring cup 84. During a downward keystroke, rim 88 of cap 87 strikes and deforms absorption mechanism 71 as stem 89 pushes the contact disk of the spring cup 84 onto the circuit board 85.

In this embodiment of the invention, the low-impact keyboard can be designed using several different circuit board styles, including a traditional, non-flexible printed circuit board as well as the flexible style shown in FIG. 5A. The impact sheet 71 must be thick enough so that some deformation is achieved by the impact of the rim 88 prior to the stem 89 pushing the contact disk of the spring cup 84 onto the circuit board 85. Otherwise, the impact is absorbed by the circuit board 85 instead of the impact sheet 71.

Figure 7:
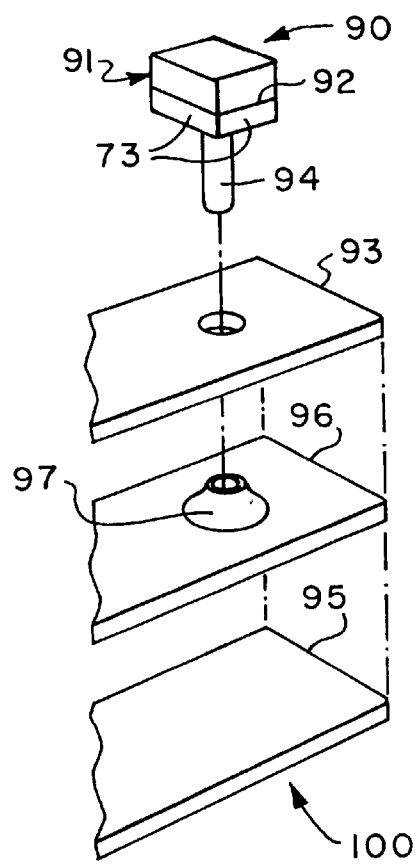
FIG. 7 is a partial exploded perspective view of a computer keyboard having a stem style key incorporating an embodiment of the present invention.

Referring to FIG. 7, another embodiment of the present invention is shown in which the impact absorbing mechanism is an impact ring 73. Key 90 includes a cap 91 having a rim 92 and a stem 94. Mounted on rim 92, impact ring 73 contacts the key cap strike plate 93 of keyboard 100, compresses during the downward keystroke, and returns to its original state on the upward key movement after stem 94 pushes the contact disk of spring cup 97, mounted on spring template 96, onto the circuit board 95 to create an electrical contact. In this manner, the impact is absorbed by the impact ring 73.

Figure 8:
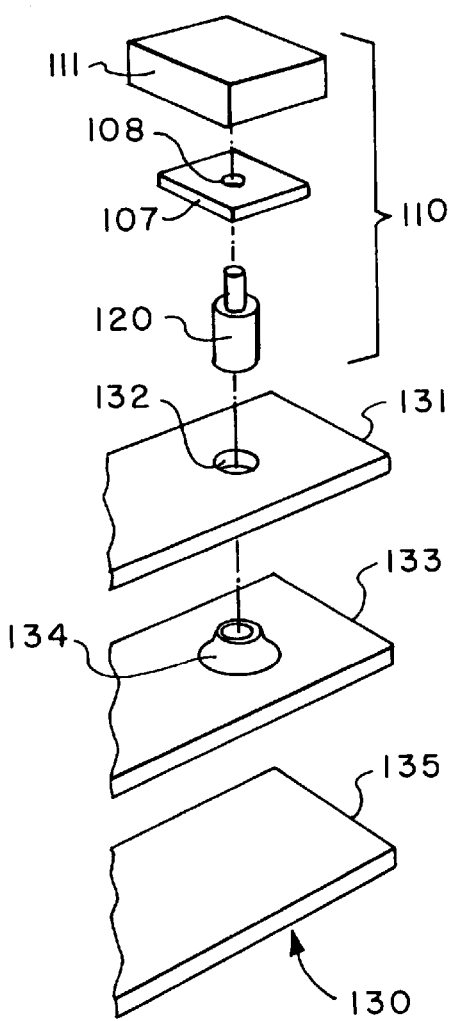
FIG. 8 is a partial exploded perspective view of a computer keyboard having a two-part key, incorporating an embodiment of the present invention.
Figure 9A:
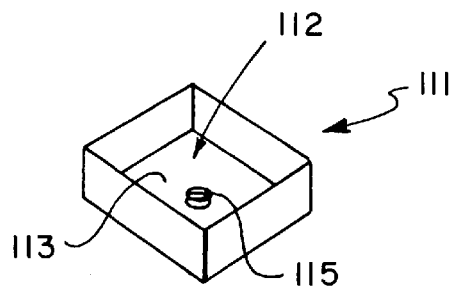
FIG. 9A is a bottom perspective view of the cap of FIG. 8.
Figure 9B:
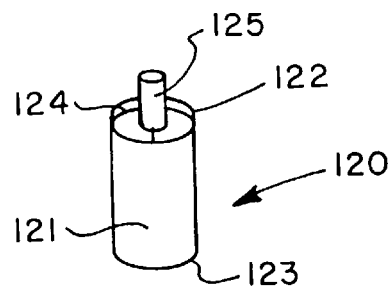
FIG. 9B is a perspective view of the stem of FIG. 8.

With reference to keyboard 130 of FIGS. 8 and 9, another embodiment of the present invention is shown wherein the impact absorbing mechanism is an individual key impact sheet 107 having an aperture 108. Key 110 includes a cap 111 and a stem 120. FIG. 9A is a bottom perspective view of the cap 111 showing an interior 112 with an upper interior surface 113 and a stem attachment slot 115. FIG. 9B is a perspective view of the stem 120 showing a body section 121 having a top end 122, a bottom end 123, and an interior 124 including a cap attachment tab 125 which fits into slot 115. Impact sheet 107 is mounted within interior 112 of key 110 on the upper interior surface 113. Aperture 108 permits assembly of the key using conventional attachment means 115 and a slightly longer tab 125 without disturbing the functionality of absorption mechanism 107.

Referring again to FIG. 8, the stem 120 is long enough to prevent the key cap 111 from striking the strike plate 131. Instead, the bottom 123 of stem 120 pushes the contact disk of the spring cup 134, mounted on spring template 133, onto the circuit board 135 before the key cap 111 reaches the strike plate 131. The impact absorbing sheet 107 absorbs the impact as it is deformed between the top 122 of the stem 120 and the upper interior surface 113 of the key cap 111. When the key 110 is released, the impact absorbing sheet 107 returns to its original shape as the key is returned to its raised position by spring cup 134.

The impact absorbing mechanism described above, including 70, 72, 73, and 107 may be made from several resilient or elastomeric substances. Materials and blends of materials suitable for construction of the impact absorbing mechanisms of the present invention include resilient polymers and blends such as polyethylene, a crosslinked polyethylene, polyurethane-polyether, polyurethane-polyester, and nitrile rubbers. One preferred material is Ensolite®, a blend of nitrile rubber and poly vinyl chloride (PVC) plastics available with densities in the range of 3.8–8.5 PCFs (pounds per cubic foot).

It will be understood and appreciated by those skilled in the art that the actual blend and density of the material chosen to construct the impact absorption mechanism will be dependant upon the designer's preferred key movement, touch response, spring tension, and location of the impact absorbing mechanism.

Referring again to FIG. 5A, it will also be understood and appreciated by those skilled in the art that the impact absorbing mechanism may be placed anywhere in the chain of components between the user's finger and the hard impact surface upon which keys currently strike. Thus, in addition to the exemplary embodiments described herein, an impact absorbing material could also be placed on the top surfaces of the keys 60, or on the top of the spring cups 54, and still remain within the scope of the present invention. Additionally, the soft rubber spring cups 54, which currently function only to bring the keys back to their raised position, may be replaced by stiffer springs which perform the additional function of absorbing much of the impact of the keys.

Figure 10:
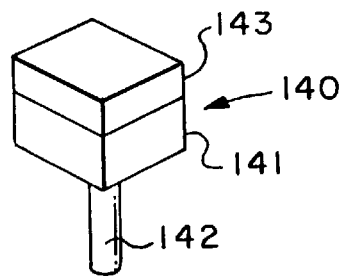
FIG. 10 is an example key style which incorporates another embodiment of the present invention.

FIG. 10 is an example key style which incorporates another embodiment of the present invention. A key 140 includes a key cap 141 and a key stem 142. Mounted on the top of the key cap 141 is a sheet of impact absorbing material 143. With this embodiment, the interior design of the keyboard is essentially unchanged, since the impact is absorbed on the top of the keys.

Figure 11:
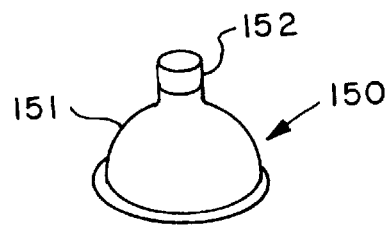
FIG. 11 is an example spring cup which incorporates another embodiment of the present invention.

FIG. 11 is an example spring cup 150 which incorporates another embodiment of the present invention. The body 151 of the spring cup is a flexible rubber or plastic cup having a conductive contact disk (not shown) mounted inside in the apex thereof. Mounted on the top of the spring cup 150 is a disk of impact absorbing material 152. During a downward keystroke, the user strikes the upper surface of the key, depressing the key cap and causing the bottom of the key stem to contact the top of the impact absorbing disk 152 directly below the key. As the downward motion continues, the stem deforms spring cup 150, causing the contact disk to contact the circuit board. When contact is made, the motion and pressure of the stem compresses the impact absorbing disk 152 on the top of the spring cup 150. The shock of the impact, and any vibrations created thereby, are absorbed into the impact absorbing disk 152 and not returned to the user's fingers and upper limbs.

It is thus believed that the operation and construction of the present invention will be apparent from the foregoing description. While the apparatus shown and described has been characterized as being preferred, it will be readily apparent that various changes and modifications could be made therein without departing from the spirit and scope of the invention as defined in the following claims.

What is claimed is:

1. An impact absorbing keyboard comprising:

a plurality of keys, each of the keys having a cap and a stem with a bottom end;

a circuit board mounted under said plurality of keys;

a key cap strike plate between the circuit board and the cap of each key, said strike plate having a top surface; and an impact absorbing sheet between the strike plate and the cap of each key, adjacent to the top surface of the strike plate, the thickness of the impact absorbing sheet being greater than the distance from the bottom of the stem to the circuit board when the key is in a raised position.

2. An impact absorbing keyboard comprising:

a plurality of keys, each of the keys having a cap with a lower rim and a stem with a bottom end;

a circuit board mounted under said plurality of keys;

a key cap strike plate between the circuit board and the cap of each key, said strike plate having a top surface; and an impact absorbing ring attached to each said lower rim between each key cap and the strike plate, the thickness of the impact absorbing ring being greater than the distance from the bottom of the stem to the circuit board when the key is in a raised position.

3. A method of absorbing the impact of a typist's fingers on a keyboard comprising the steps of:

mounting a plurality of keys on a strike plate of the keyboard, each of the keys having a cap and a stem with a bottom end that extends through an aperture in the strike plate;

mounting a flexible circuit board under the plurality of keys and below the strike plate, the flexible circuit board flexing when impacted by the stem of one of the keys during a keystroke;

mounting a circuit board support plate under the flexible circuit board; and mounting an impact absorbing sheet of sufficient thickness that it does not become fully compressed during the keystroke between the flexible circuit board and the circuit board support plate, the impact absorbing sheet absorbing the impact of the keystroke when the flexible circuit board flexes.

4. An impact absorbing keyboard comprising:

a plurality of keys, each of the keys having a vertical stem; and an impact absorbing mechanism interacting with said keys, said impact absorbing mechanism comprising:

a flexible circuit board mounted under the plurality of keys, the flexible circuit board flexing when impacted by the stem of one of the keys during a key stroke;

a circuit board support plate mounted under the flexible circuit board; and an impact absorbing sheet of sufficient thickness that it does not become fully compressed during the keystroke mounted between the flexible circuit board and the circuit board support plate, the impact absorbing sheet absorbing the impact of the keystroke when the flexible circuit board flexes.

* * * * *